(12) United States Patent
Erharter

(10) Patent No.: US 11,254,334 B2
(45) Date of Patent: Feb. 22, 2022

(54) TROLLEY FOR SUPPORTING TRANSPORTING UNITS SUSPENDED FROM A GUIDE OF A TRANSPORTATION SYSTEM AND TRANSPORTATION SYSTEM COMPRISING SUCH A TROLLEY

(71) Applicant: LEITNER S.P.A., Vipiteno (IT)

(72) Inventor: Nikolaus Erharter, San Candido (IT)

(73) Assignee: LEITNER S.P.A., Vipiteno (IT)

( * ) Notice: Subject to any disclaimer, the term of this patent is extended or adjusted under 35 U.S.C. 154(b) by 304 days.

(21) Appl. No.: 16/437,843

(22) Filed: Jun. 11, 2019

(65) Prior Publication Data

US 2019/0375433 A1 Dec. 12, 2019

(30) Foreign Application Priority Data

Jun. 12, 2018 (IT) .......................... 102018000006233

(51) Int. Cl.
*B61B 12/02* (2006.01)
*E01B 25/22* (2006.01)
*B61B 3/00* (2006.01)

(52) U.S. Cl.
CPC .............. *B61B 12/022* (2013.01); *B61B 3/00* (2013.01); *B61B 12/02* (2013.01); *B61B 12/028* (2013.01); *E01B 25/22* (2013.01)

(58) Field of Classification Search
CPC ....... B61B 12/022; B61B 12/028; B61B 3/00; B61B 3/02; B61B 7/02; B61B 11/004; B61B 12/02; B61B 10/02; B61B 10/022; B61B 15/00; E01B 25/22; E01B 25/16; E01B 25/18

USPC ......................................... 104/87; 105/149.1
See application file for complete search history.

(56) References Cited

U.S. PATENT DOCUMENTS

| 3,525,306 | A | 8/1970 | Edel et al. |
| 10,471,971 | B2 * | 11/2019 | Richardson ............ A63G 21/20 |
| 2020/0054952 | A1 * | 2/2020 | Wagner .................. A63G 21/20 |
| 2020/0239034 | A1 * | 7/2020 | Erharter .................. B61B 12/06 |

FOREIGN PATENT DOCUMENTS

| EP | 0 692 419 | 1/1996 |
| EP | 1 034 996 | 9/2000 |
| EP | 1 227 022 | 7/2002 |
| EP | 1227022 A2 * | 7/2002 ........... B61B 12/122 |

(Continued)

OTHER PUBLICATIONS

Italian Search Report for Italian Application No. IT 2018000006233 dated Feb. 1, 2019.

*Primary Examiner* — S. Joseph Morano
*Assistant Examiner* — Cheng Lin
(74) *Attorney, Agent, or Firm* — Neal, Gerber & Eisenberg LLP

(57) ABSTRACT

A trolley for supporting transporting units of a transportation system, wherein the transporting units are supported suspended from a guide defining a direction of movement; the trolley comprising: a frame; rolls supported by the frame and configured for resting and rolling on the guide; a suspending arm for supporting the transporting units, wherein the suspending arm pivots constrained to the frame about the direction of movement between a first and a second angular position; a rotation limiting device selectively operable for limiting or blocking the rotation of the suspending arm with respect to the frame.

9 Claims, 4 Drawing Sheets

(56) References Cited

FOREIGN PATENT DOCUMENTS

| WO | WO 2009/130239 | 10/2009 | | |
|---|---|---|---|---|
| WO | WO 2015/077806 | 6/2015 | | |
| WO | WO-2015077806 A1 * | 6/2015 | ............... | B61B 7/02 |

* cited by examiner

TROLLEY FOR SUPPORTING TRANSPORTING UNITS SUSPENDED FROM A GUIDE OF A TRANSPORTATION SYSTEM AND TRANSPORTATION SYSTEM COMPRISING SUCH A TROLLEY

PRIORITY CLAIM

This application claims the benefit of and priority to Italian Patent Application No. 102018000006233, filed on Jun. 12, 2018, the entire contents of which are incorporated by reference herein.

TECHNICAL FIELD

The technical field of the present disclosure is that of transportation systems. In particular, the technical field of the present disclosure relates to a transportation system provided with a guide for supporting a plurality of transporting units suspended from the ground and moved along the route defined by the guide itself. In detail, each transporting unit is connected through a suspending arm to a respective trolley provided with rolls resting and sliding on the guide. Therefore, the term "suspended" means that the transporting units do not rest on a lower structure, in contrast to the technical field of transportation systems wherein the transporting units are supported by resting on a lower guide. As regards the guide, the technical field of the present disclosure encompasses cable systems (i.e., comprising at least one supporting cable), rail systems, as well as hybrid systems in which a cable transportation portion and a rail transportation portion follow one another without transportation interruption. The expression "without transportation interruption" means that passengers do not have to get off the transporting unit at the end of the cable transportation section and onto another transporting unit in order to travel on the rail transportation section. However, "without transportation interruption" does not mean that the transporting units may not be stopped at stations located along the route. With regard to the advance of the transporting units along the guide, the technical field of the present disclosure encompasses both systems provided with a hauling cable and systems in which the suspension trolleys are provided with a suitable motor.

BACKGROUND

Transportation systems in which people or things are transported along a route inside transporting units fed along a guide one after the other in a raised configuration with respect to the ground level are relatively widely used. That is, the raised configuration with respect to the ground level is advantageous when the conformation of the underlying ground or other boundary factors do not make the alternative motion practicable, the alternative motion referring to transporting units, such as for example train carriages, that travel resting on guides which in turn are more or less directly lying on the ground.

Transportation systems with transporting units moved suspended and raised from the ground level can be divided into two different types depending on the morphology of the route to be followed. Each type of transportation system has peculiarities that are better suited to different boundary conditions.

A first type of transportation system is a system wherein the route comprises major elevation changes, even with considerable slopes, and a substantially rectilinear layout. Such a route is typical of ski lifts in ski/mountain resort areas. The transportation systems used in such conditions are cable systems (i.e., systems in which the support guide for the transporting units comprises at least one supporting cable). Moreover, considering the slopes, the motion is also delegated to a cable, known as the hauling cable. To maximize the capacity of the cable system, it is relatively common to use systems comprising two supporting cables and one hauling cable. In this configuration, it is possible to use a support trolley capable of supporting sizeable cabins. Such a trolley, known per se to the skilled person in the art, is equipped with rolls for rolling on the supporting cables and with a clamp for selective coupling to the hauling cable. In these cable systems, the trolleys are provided with special joints or pins to enable both transversal rotation (i.e., for rolling around the supporting cable) and longitudinal rotation (i.e., for pitching) of the transporting units with respect to the trolley. In this way, the transmission to the cables of the transverse forces transmitted by the wind (often present in ski/mountain areas) on the transporting units and of the longitudinal forces linked to variations in the route slope and the longitudinal speed of the transporting units is reduced. These free oscillations, that is, without particular constraints imposed within a free angular range, in addition to absorbing the forces indicated above, also enable benefits in terms of relative passenger travel comfort. Furthermore, ski/mountain areas are usually free of external structural constraints that could limit such free oscillations, in particular roll oscillations.

The second type of transportation system known implies substantially flat routes (that is, without elevation changes) with a plurality of curves in plan. These systems can be defined as urban because it is precisely in urban centers that there is the need to design these raised routes with respect to the already unfortunately sufficiently congested road traffic. In such routes, the support guide of the transporting units is usually a rail guide. As the slopes in this route are absent or of little relevance, the advance of the transporting units can disregard the presence of the hauling cable and be delegated to a motorized support trolley. Naturally, from a technical point of view, there are no limitations on also using guides in the form of cables and delegating the motion to a hauling cable in urban routes. In such urban routes, external conditions are very different from those found in mountain routes. For example, in urban areas there is relatively less exposure to the wind and greater structural constraint due to the presence of external structures surrounding the route.

Certain systems definable as "hybrid" are also known, that is, with sections of the route with high slopes but straight in plan, which would be suitable for cable transportation, followed by sections of the route characterized by the absence of differences in level but with considerable curves in plan, the latter sections being suitable for rail transportation. In these cases, it is known to provide two different systems one after the other in which, even in the presence of a shared intermediate interchange station, users are required to change transporting units to pass from one system to the other. Even if the systems are adjacent, there is still a relative inconvenience for passengers due to the transfer from one system to the other. An alternative solution does not require passengers to change units when passing from one section of the system to the other. For instance, PCT Patent Application No. WO2015/077806 describes a transportation system wherein the transporting units travel without transportation interruption along the route in which cable transportation portions and rail transportation portions follow one another. According to PCT Patent Application No. WO2015/077806, the transporting units, for cabins, comprise, externally to the roof, a frame constrained to a trolley supported by the supporting cables. The exchange from a cable route portion to a rail route portion takes place in the station where the transporting units are already usually released from the cables and advance supported, suspended from special upper tracks. Before leaving the station, the trolley of the transporting units couples to a second motor or motorized trolley resting on these upper rails. Therefore, in this configuration, the transporting units are supported by the rail and hanging in mid-air, with their trolley coupled to the motorized trolley. As a result of the motorization of the motor trolley, the transporting units move along the tracks and travel (always uplifted) over a rail route section. Therefore, according to PCT Patent Application No. WO2015/077806, the transporting units used along the cable system section are also entirely used along the rail transportation section where the use of motor trolleys travelling on rails is also envisaged. Alternatively, although not described in PCT Patent Application No. WO2015/077806, the motorized trolley for advancing on the rails could also be the same trolley for advancing on the cables without providing an auxiliary trolley for the rail section alone. Simply, the motor on the trolley may not be in operation along the cable section, delegating the advance to a hauling cable.

However, both this last solution as described above and that expressly described in PCT Patent Application No. WO2015/077806 have some drawbacks. As described above, when the different types of systems have been analyzed, in cable systems roll oscillations of the cabins with respect to the trolley must be allowed to absorb the lateral wind forces and there are no external structural constraints. In contrast, in urban systems (usually rail systems) such roll oscillations must be avoided due to the curves in plan along the route (i.e., this oscillation in curve causes relatively low travel comfort). Furthermore, in urban areas, on the one hand the wind is not such as to expressly require these free roll oscillations and on the other hand there are such external structural constraints (for example the buildings surrounding the route) that the free space for transverse rolling is reduced.

From this analysis it follows that using the same support trolley for the two routes makes the system not optimal in its entirety. As such, a trolley free to oscillate would be perfect along the cable section but not suitable for the rail section, whereas a trolley whose roll rotation is inhibited would be comfortable in urban areas but would put the cable system section at risk as regards the forces transmitted to the structure. This problem naturally also occurs in the presence of an auxiliary trolley for the rail section as provided in PCT Patent Application No. WO2015/077806.

SUMMARY

Therefore, the object of the present disclosure is to provide a trolley configured to support transporting units suspended from guides of a transportation system, which can overcome certain of the aforementioned drawbacks of certain of the prior art. In particular, the main object of the present disclosure is to provide a trolley configured to support transporting units suspended from guides of a transportation system, which is optimal if used in systems with routes having elevation changes as well as curves in plan. In addition to reducing relative design costs by providing a trolley that can be used in different types of systems, another advantage of the disclosure will be found in hybrid cable/rail systems in which the trolley, and hence the transporting unit, advances with no service interruption from one section of the system to the other.

In accordance with these objects, according to its general definition, the present disclosure relates to a trolley configured to advance along a guide, which defines a direction of movement of a transportation system, and configured to support a respective transporting unit suspended from the guide; this trolley comprises:

a frame;
rolls supported by the frame and configured for resting and rolling on the guide;
a suspending arm on the one hand configured to be coupled to the respective transporting unit and on the other hand pivoting constrained to the frame about an axis parallel to the direction of movement between a first and a second angular position.

In particular, according to one inventive aspect of the disclosure, the trolley further comprises a device configured to limit the rotation of the suspending arm with respect to the frame, wherein such a rotation limiting device is selectively operable for limiting or blocking the rotation of the suspending arm with respect to the frame during the motion of the trolley along at least one portion of the transportation system.

Advantageously, in this way, when the trolley is travelling along a section of the system in which the guide, for example, defines relatively major elevation changes typical of mountain systems with relatively strong exposure to the wind, the transporting unit is free to perform the classic roll rotations currently permitted to avoid relatively high stress transmission to the structure. Instead, when the trolley is travelling along a section of the system in which the guide, for example, defines relatively minor elevation changes but relatively major curves in plan typical of urban systems without relatively strong exposure to the wind, roll rotations of the transporting unit are limited or blocked to increase relative travel comfort and not interfere with the external structures surrounding the system.

Transportation systems where the aforementioned trolley finds its natural application are hybrid transportation systems in which sections of the system configured as cable transportation and sections of the system configured as rail transportation follow one another. In such a system, during the motion along the cable section, the rotation limiting device will be deactivated, whereas it will be activated during motion via rail.

In certain embodiments, the cable system section comprises two supporting cables and one hauling cable. In certain embodiments, the trolley is motorized for motorized advance along the rail.

However, the system could also be a cable system over the entire route, that is with supporting cables and a hauling cable even in the flat section and with curves in plan.

Additional features are described in, and will be apparent from the following Detailed Description and the figures.

BRIEF DESCRIPTION OF THE DRAWINGS

Further features and advantages of the present disclosure will be apparent from the following description of a non-limiting embodiment thereof, with reference to the figures of the accompanying drawings, wherein.

DETAILED DESCRIPTION

Figure 1:
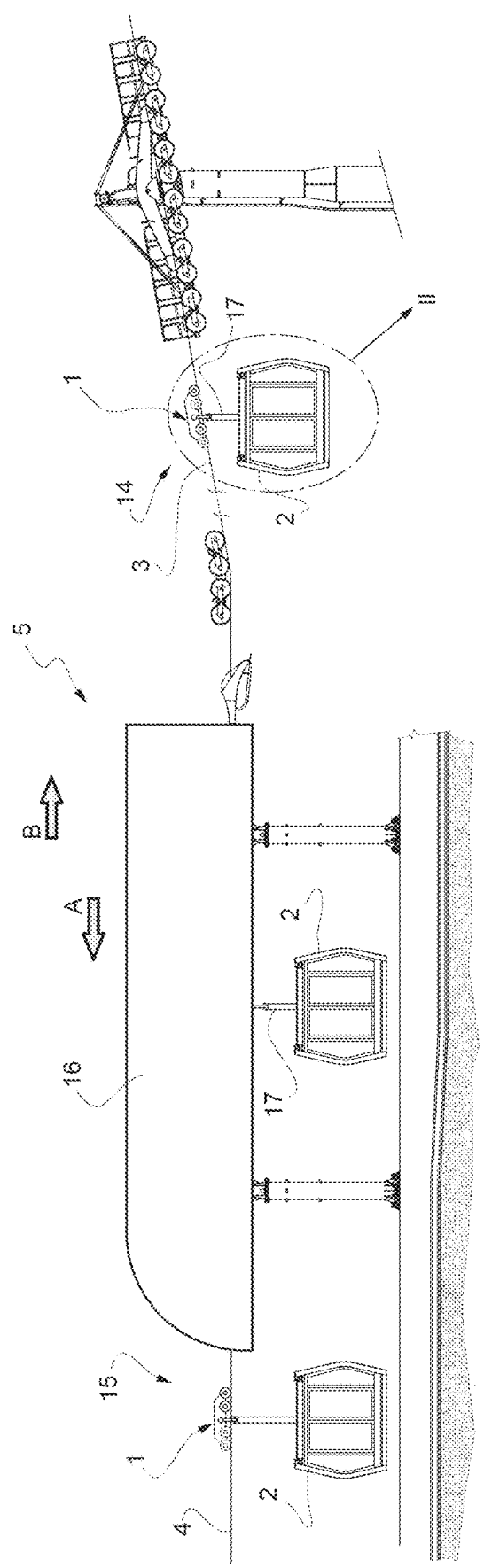
FIG. 1 is a schematic view of a hybrid cable/rail transportation system in which the trolley of the present disclosure finds advantageous application.

Referring now to the example embodiments of the present disclosure illustrated in FIGS. 1 to 5 and specifically referring to FIG. 1 which schematically shows a portion of a hybrid cable/rail transportation system in which the inventive trolley of the present disclosure finds advantageous application. Naturally, as shown in the general description of the disclosure, the innovative trolley of the present disclosure can also be used in systems in which the entire route is a cable route or a rail route.

FIG. 1 shows a portion of a system 5 comprising a section 14 configured as a cable transportation system and a second successive section 15 configured as a rail transportation system. In both sections 14 and 15 of the system, a plurality of transporting units 2 in the form of cabins 2 (however they could also be in a different form) are moved in succession in a suspended configuration, that is raised from the ground and not resting on anything below. The systems can be of various types, for example back-and-forth systems or systems with ascent and descent return branches, and comprise a plurality of stations at which passengers can enter or exit the cabins. FIG. 1 shows an intermediate station 16 between an upstream station and a downstream station (not shown). As can be seen, the cabins 2 enter the station 16 supported by a first type of guide and when they exit the station 16 they are supported by a different type of guide. As indicated, the cabins 2 can travel along the system 5 in both of the directions indicated by the arrows A and B. When analyzing, for example, the path defined by the arrow A, upstream of the station 16 the cabins 2 are supported suspended from at least one cable 3. In particular, each cabin 2 is connected to a respective trolley 1 configured to rest and roll on the cable 3. The cabin 2 is kept suspended from the trolley 1 by a suspending arm 17 having one end coupled to the roof 18 of the cabin 2 and the opposite end coupled to the trolley 1. In the station 16, the cabin 2 advances no longer supported by the cable 3, but on special tracks formed in the station 16 itself. Downstream of the station 16, the cabins 2 are supported no longer suspended from the cable 3, but on a pair of tracks 4, thus providing a portion of rail transportation system 15. These tracks 4 can also be the physical extension of the above-mentioned tracks present in the station 16. In this rail section 15, the cabins 2 are supported on the tracks 4 by the same trolley 1 which also supported the cabins 2 on the cable 3. As mentioned above, in the cable section 14, the advance of the cabins 2 is usually driven by a hauling cable 13, while in the rail section 15, usually characterized by low slopes, the advance of the cabins 2 can be driven by a motor already present in the trolley 1. Alternatively, as described for example in PCT Patent Application No. WO2015/077806, before leaving the station 1, the trolley 1 is coupled to a second trolley (not shown in FIG. 1) specially provided with a motor configured to advance on the tracks. The present disclosure is naturally advantageously applicable in both cases.

Figure 2:
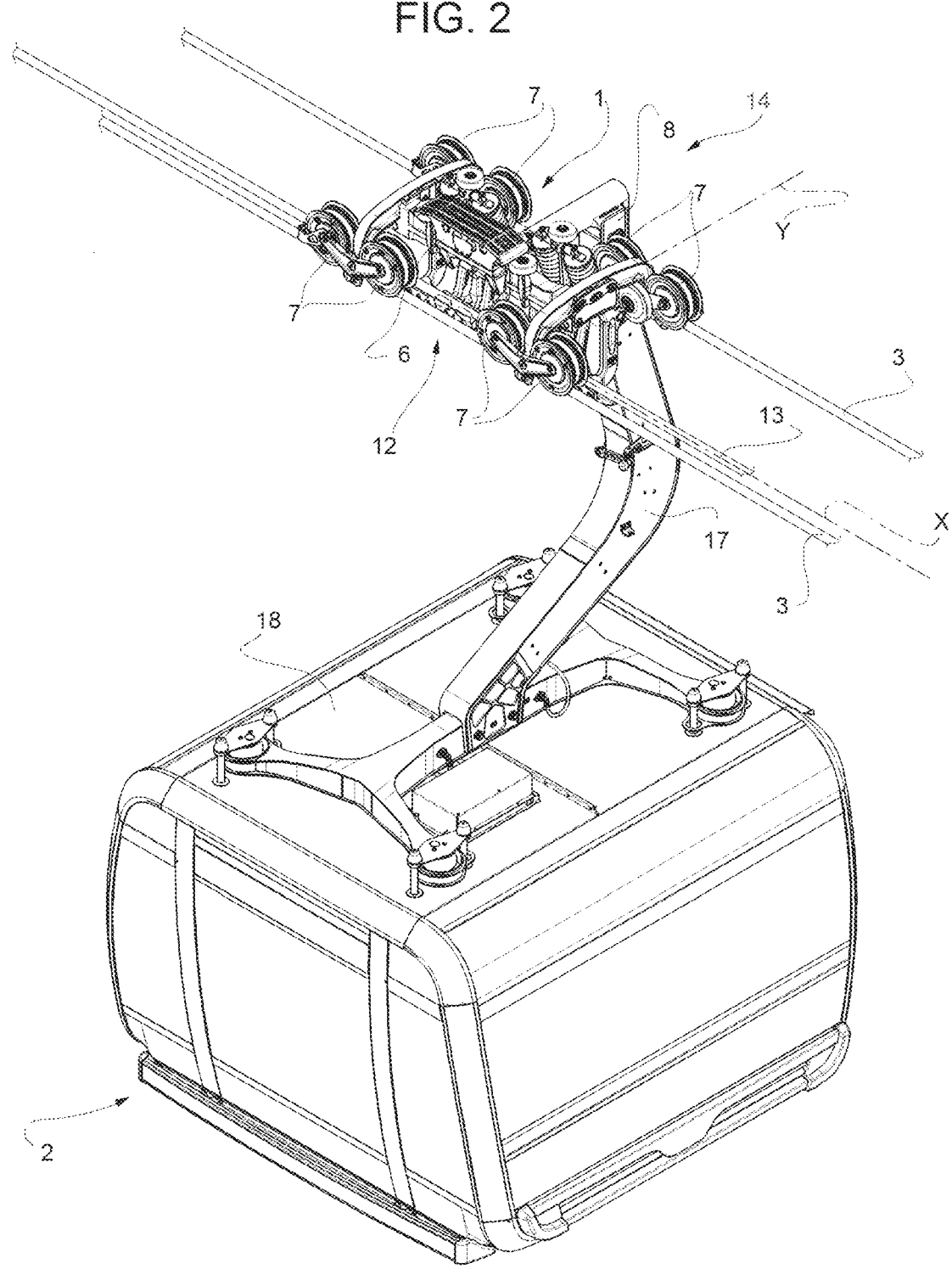
FIG. 2 is an enlarged schematic view of the detail indicated as II in FIG. 1.

FIG. 2 shows an enlarged schematic view of the detail indicated as II in FIG. 1. In particular, this figure shows an example of a cable section 14 configured as a three-cable system with two supporting cables 3 and one hauling cable 13. The example in FIG. 2 shows a trolley 1 comprising a frame 6 which supports four pairs of rolls 7, two front pairs and two rear pairs, respectively. The trolley has a clamp 12 for selective coupling to the hauling cable 13 and spring-type shock absorbing elements and other rolls configured to guide the trolley 1 in the station 16. FIG. 2 also shows that the suspending arm 17 protruding from the roof 18 of the cabin 2 is coupled to the frame 6 by a support arm 8. This coupling is configured to enable the cabin 2 pitch rotations (i.e., rotations around the axis referred to in the figure as Y, orthogonal to the direction of movement indicated by X and simplifiable by the axis of the hauling cable 13).

Figure 3:
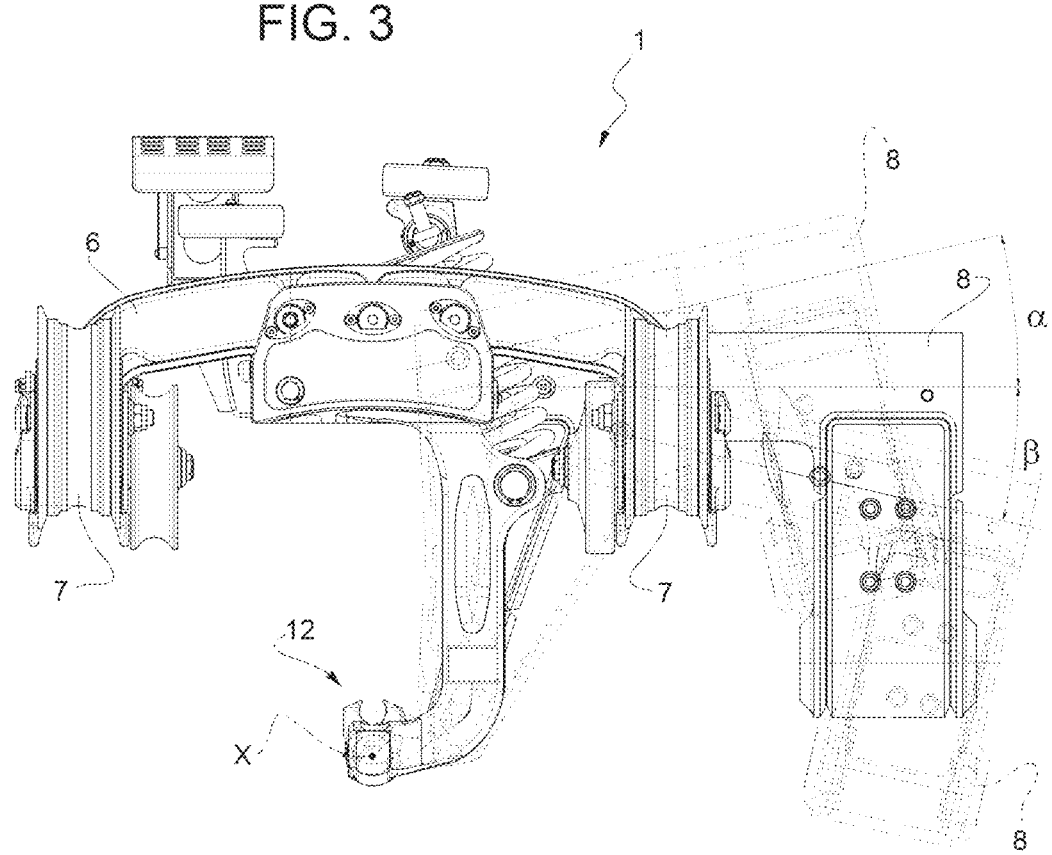
FIG. 3 is a front view of the trolley in FIG. 2.

FIG. 3 shows a front view of the trolley in FIG. 2. This figure makes it possible to highlight that the support arm 8 is connected to the frame 6 of the trolley in a movable manner, in particular in a rotary manner about an axis substantially coinciding with the axis X of the hauling cable 13. The support arm 8 is therefore rotatable about this axis X between two different angular positions. In FIG. 3, references α and β indicate two maximum opposite angular ranges allowed to the support arm 8 with respect to a neutral position in which the cabin 2 is substantially aligned with the vertical direction defined by the force of gravity. These rotations α and β serve the purpose of not transmitting to the system excessive forces resulting from the action of the transverse wind on the cabins 2.

Figure 4:
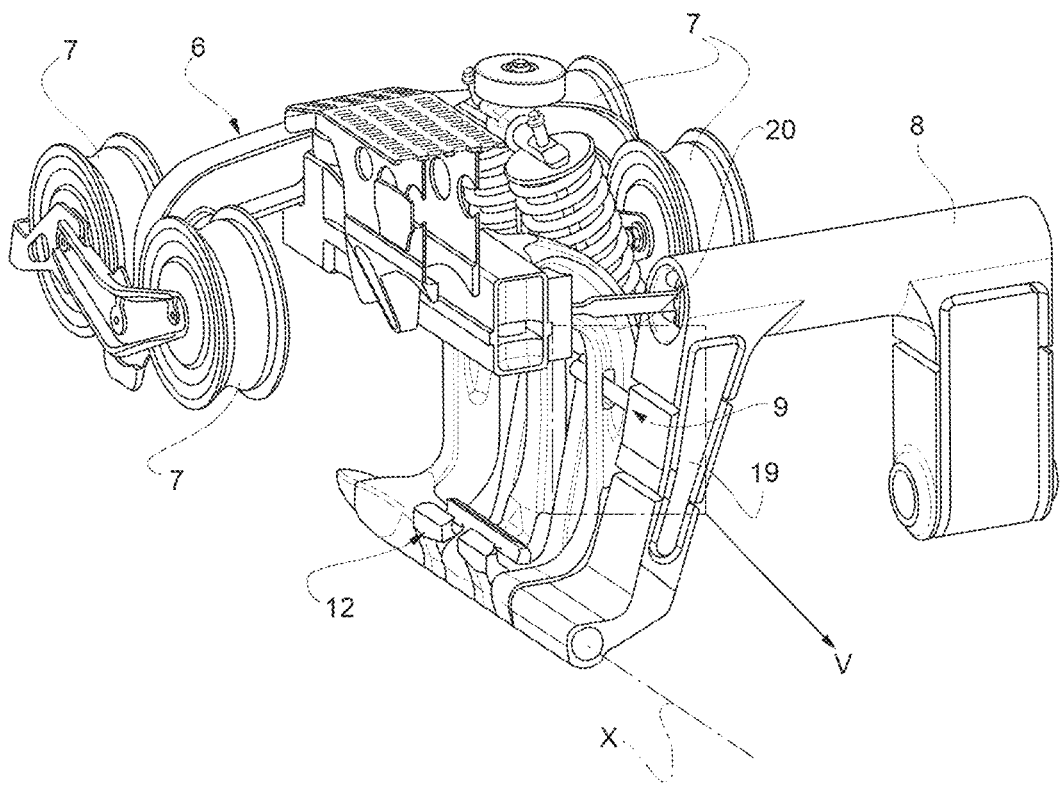
FIG. 4 is a perspective view of a portion of the trolley in FIG. 3.
Figure 5:
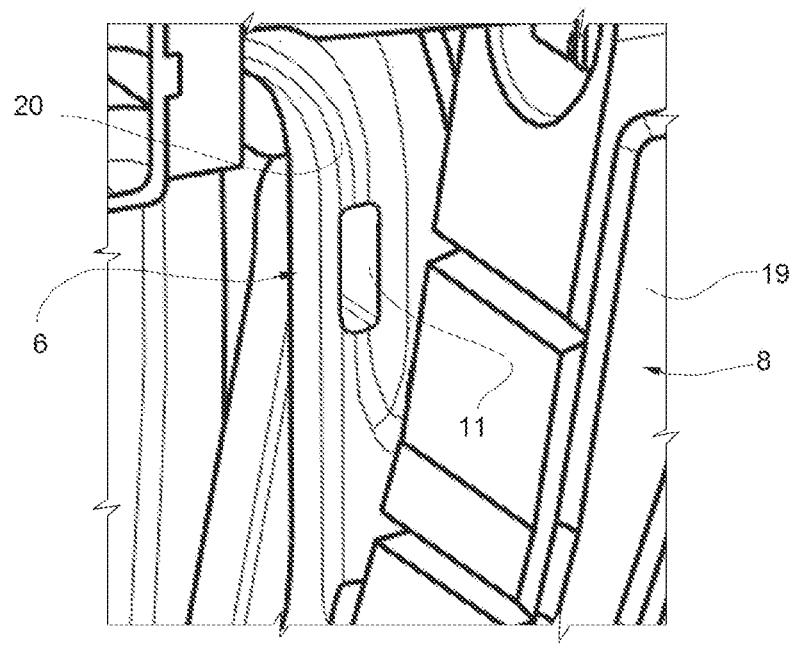
FIGS. 5 and 6 are enlarged views of the detail indicated as V in FIG. 4 according to two different configurations of use of the trolley according to one embodiment of the present disclosure.
Figure 6:
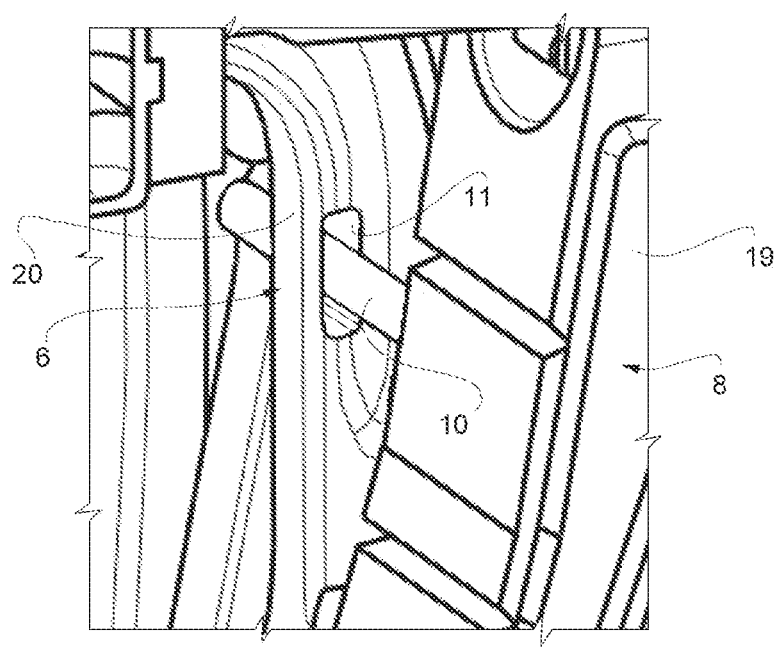

FIG. 4 shows a perspective view of a portion of the trolley in FIG. 3. In particular, the front portion with the front rolls has been removed from the trolley in FIG. 3 to make the coupling between the support arm 8 and the frame 6 of the trolley 1 more evident. In particular, FIG. 4 shows that both the support arm 8 and the frame 6 have a first 19 and a second portion 20, respectively, in the form of plates, extending substantially vertically and facing each other at least when the support arm 8 is in the above-mentioned neutral position. FIG. 4 and the enlargement in FIG. 6 show a pin 10 extending substantially parallel to axis X protruding from the first plate 19 and penetrating into a hole 11 formed in the second plate 20. In this configuration, the rotation of the support arm 8 with respect to axis X is restricted by the geometry of the hole 11. In certain embodiments, if the hole 11 is slotted, the support arm 8 can however move angularly, although with angular movements much smaller in absolute value than those shown in FIG. 3. In certain embodiments, if the hole 11 is substantially the same size as the pin 10, the rotation of the support arm 8 with respect to axis X is then substantially inhibited. However, this pin 10 is not fixed, but movable between an extracted position (that in FIG. 6) wherein it is inserted in the hole 11, thus limiting or inhibiting the rotation of the support arm 8, and a retracted position (shown schematically in FIG. 5) wherein it is not inserted in the hole 11, thus not interfering with the free rotation of the support arm 8, as currently known. The pin 10 can be automatically operated hydraulically or electro-mechanically or mechanically when passing from the cable to the rail transportation section. Of course, the coupling pin 10—hole 11 is only one of several possible embodiments for selectively limiting or inhibiting the rotation of the arm 8 with respect to axis X. Just to mention an alternative example, the pin can be supported by the second plate 20 and the hole formed in the first plate 19.

Lastly, it is clear that modifications and variations may be made to the disclosure described herein without departing from the scope of the appended claims and without diminishing its intended technical scope. That is, various changes and modifications to the present embodiments described herein will be apparent to those skilled in the art and it is therefore intended that such changes and modifications be covered by the appended claims.

The invention is claimed as follows:

1. A trolley comprising:
   a frame;
   a plurality of rolls connected to the frame and configured to rest and roll on a guide defining a direction of movement;
   a suspending arm configured to support a transporting unit, wherein the suspending arm is configured to pivot constrained relative to the frame about an axis parallel to the direction of movement between a first angular position and a second angular position; and
   a rotation limiting device selectively operable to limit a rotation of the suspending arm with respect to the frame, wherein the rotation limiting device comprises a pin supported by the suspending arm, the pin being moveable between an extracted position wherein the pin is inserted in a hole defined by the frame and a retracted position wherein the pin is not inserted in the hole.

2. The trolley of claim 1, wherein the rotation limiting device is selectively operable for blocking the rotation of the suspending arm with respect to the frame.

3. The trolley of claim 1, wherein the hole comprises a slotted hole.

4. The trolley of claim 1, wherein the frame supports a clamp configured for coupling to a hauling cable.

5. The trolley of claim 1, wherein the plurality of rolls are configured to rest and roll on each of a plurality of supporting cables and on a plurality of rails.

6. The trolley of claim 1, wherein the plurality of rolls are motorized.

7. A trolley comprising:
   a frame;
   a plurality of rolls connected to the frame and configured to rest and roll on a guide defining a direction of movement;
   a suspending arm configured to support a transporting unit, wherein the suspending arm is configured to pivot constrained relative to the frame about an axis parallel to the direction of movement between a first angular position and a second angular position; and
   a pin supported by the suspending arm, the pin being moveable between an extracted position wherein the pin limits a rotation of the suspending arm with respect to the frame and a retracted position wherein the pin does not limit the rotation of the suspending arm with respect to the frame.

8. A transportation system comprising:
   a transporting unit;
   a guide defining a direction of movement;
   a trolley including a frame, a plurality of rolls supported by the frame and configured to rest and roll on the guide, a suspending arm configured to support the transporting unit in a suspended configuration, wherein the suspending arm is configured to pivot constrained relative to the frame about an axis parallel to the direction of movement between a first angular position and a second angular position, and a rotation limiting device selectively operable to limit a rotation of the suspending arm with respect to the frame;
   a first portion configured as a cable transportation system including two supporting cables, wherein the first portion is configured as a cable transportation system including a hauling cable to move the trolley on the two supporting cable, and during movement of the trolley along the first portion, the rotation limiting device of the trolley is not operable to limit the rotation of the suspending arm with respect to the frame; and
   a second portion configured as a rail transportation system including at least a pair of rails, wherein during a movement of the trolley along the second portion, the rotation limiting device of the trolley is operable to limit the rotation of the suspending arm with respect to the frame, wherein the first portion is at least one of upstream and downstream of the second portion, and the trolley is configured to rest and roll on the two supporting cables and on the pair of rails.

9. The transportation system of claim 8, wherein the rotation limiting device of the trolley is selectively operable for blocking the rotation of the suspending arm with respect to the frame.

* * * * *